United States Patent
Hsiao et al.

(10) Patent No.: US 8,814,413 B2
(45) Date of Patent: Aug. 26, 2014

(54) BACKLIGHT MODULE AND LIQUID CRYSTAL DISPLAY USING THE SAME

(75) Inventors: Yu-chun Hsiao, Shenzhen (CN); Ruilian Yang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 241 days.

(21) Appl. No.: 13/377,548

(22) PCT Filed: Nov. 11, 2011

(86) PCT No.: PCT/CN2011/082079
§ 371 (c)(1),
(2), (4) Date: Dec. 10, 2011

(87) PCT Pub. No.: WO2013/063825
PCT Pub. Date: May 10, 2013

(65) Prior Publication Data
US 2013/0114288 A1    May 9, 2013

(30) Foreign Application Priority Data
Nov. 4, 2011    (CN) ..................... 2011 2 0435944 U

(51) Int. Cl.
*F21V 7/04*    (2006.01)
(52) U.S. Cl.
USPC .......................................... 362/608; 362/621
(58) Field of Classification Search
USPC ......... 362/555, 558, 582, 560, 608, 621, 97.1
See application file for complete search history.

(56) References Cited

U.S. PATENT DOCUMENTS

| | | | |
|---|---|---|---|
| 6,283,602 B1* | 9/2001 | Kawaguchi et al. | 362/608 |
| 2005/0265045 A1* | 12/2005 | Moon | 362/560 |
| 2006/0268537 A1* | 11/2006 | Kurihara et al. | 362/34 |
| 2008/0084708 A1 | 4/2008 | Lee et al. | |
| 2008/0130314 A1* | 6/2008 | Liu et al. | 362/616 |
| 2008/0137328 A1* | 6/2008 | Lee et al. | 362/224 |
| 2008/0158907 A1* | 7/2008 | Lin et al. | 362/606 |
| 2009/0052205 A1* | 2/2009 | Chen et al. | 362/612 |
| 2009/0168459 A1* | 7/2009 | Holman et al. | 362/623 |
| 2010/0002461 A1* | 1/2010 | Wu et al. | 362/558 |
| 2010/0183333 A1* | 7/2010 | Kim et al. | 399/168 |

FOREIGN PATENT DOCUMENTS

| | | |
|---|---|---|
| CN | 2881329 Y | 3/2007 |
| CN | 201107517 Y | 8/2008 |
| CN | 101625077 A | 1/2010 |
| CN | 101666462 A | 3/2010 |

OTHER PUBLICATIONS

International Search Report of the PCT Application No. PCT/CN2011/082079.

* cited by examiner

*Primary Examiner* — Julie Bannan

(57) ABSTRACT

The present disclosure provides a backlight module. The backlight module includes at least one light tube. Each light tube includes a light emitting side for emitting light and a first micro-structure disposed on the light emitting side for breaking total reflections of the light in the light tube. With the first micro-structure disposed on the light emitting side of the light tube, the total reflections of the light in the light tube can be broken to allow the light to be emitted from the light tube evenly. Also, the reflecting structure is disposed on non-light emitting side for improving the using efficiency of the light and reducing the manufacturing cost of the backlight module. Additionally, the fluorescent layer is coated on the light emitting side for improving a color saturation level of a LCD using the backlight module.

8 Claims, 4 Drawing Sheets

BACKLIGHT MODULE AND LIQUID CRYSTAL DISPLAY USING THE SAME

BACKGROUND

1. Technical Field

The present disclosure relates to liquid crystal displaying technologies, and particularly, to a backlight module and a liquid crystal display using the same.

2. Description of Related Art

Cold cathode fluorescent lamps (CCFLs) or light emitting diodes (LEDs) matrix are often used in backlight modules of liquid crystal displays (LCDs) as a light source. As CCFL includes mercury, which is harmful to the environment, it is tend to be replaced by LED matrix. For the LED matrix, since it includes a number of LEDs, heat generated thereby is so much that the displaying effect of the LCD is influenced. Therefore, a heat dissipating structure is generally needed for LED matrix. However, the heat dissipating structure raises the cost of the LCD.

In another aspect, to even light coming out from the light source and to improve the efficiency of the light source, a point light source is usually converted to a line light source. Specifically, two point light sources are fixed to two ends of a light tube, and one side of the light tube along the longitude direction thereof is coated with metal reflecting layer. In this way, total reflections of light occur in the light guide are broken by scattering reflections on the surface of the metal reflecting layer to allow the light tube to emit the light evenly. However, the metal reflecting layer also raises the cost of the LCD panel.

Therefore, there is room for improvement.

SUMMARY

The present disclosure provides a backlight module. The backlight module includes a light tube. The light tube includes a light emitting side for emitting light and a first micro-structure disposed on the light emitting side for breaking total reflections of the light in the light tube.

Preferably, the backlight module further includes a fluorescence layer coated on a surface of the first micro-structure.

Preferably, the light tube is made of polymethyl methacrylate or silicon dioxide, and the light tube further includes a non-light emitting side opposite to the light emitting side and a reflecting structure disposed on the non-light emitting side.

Preferably, the light tube further includes a second micro-structure disposed on the non-light emitting side, the reflecting structure is a reflecting plate or a reflecting film disposed on the second micro-structure; and the second micro-structure includes a number of protrusions protruding from the non-light emitting side and a cross section of each protrusion is hemisphere, rhombic, or semi-oval.

Preferably, the first micro-structure includes a number of grooves defined on the light emitting side and the cross section of each groove is hemisphere, rhombic, or semi-oval.

Preferably, a cross section of the light tube is circular or elliptical.

Preferably, the cross section of the light tube is fan shaped, and the light tube includes an arch surface corresponding to the non-light emitting side and two flat surfaces corresponding to the light emitting side.

Preferably, the light tube further includes at least a light source coupling device for supplying and emitting light to the light tube, and the at least one light source coupling device is disposed on at least one end of the light tube.

Preferably, the backlight module further includes a back plate, a reflecting plate, a diffusing plate and an optical film, the back plate includes a base portion and two side portions extending from two opposite ends of the base portion, the reflecting plate is arranged on the base portion; the light tube is sandwiched between the reflecting plate and the diffusing plate, and the optical film is arranged on one side of the diffusing plate away from the light tube.

Preferably, the backlight module further includes a back plate, a reflecting plate, a light guide plate, and an optical film, the back plate includes a base portion and two side portions extending from two opposite ends of the base portion, the reflecting plate is arranged on the base portion, the light guide plate is sandwiched between the reflecting plate and the optical film, the light tube is arranged between the side portion and the light guide plate with a light emitting side thereof facing a light incident surface of the light guide plate.

The present disclosure further provides a liquid crystal display. The liquid crystal display includes a backlight module having a light tube. The light tube includes a light emitting side for emitting light and a first micro-structure disposed on the light emitting side for breaking total reflections of the light in the light tube.

In the present disclosure, the first micro-structure is disposed on the light emitting side of the light tube for breaking the total reflections of the light in the light tube and allowing the light to be emitted from the light tube evenly. Also, the reflecting structure is disposed on non-light emitting side for improving the using efficiency of the light and reducing the manufacturing cost of the backlight module. Additionally, the fluorescent layer is coated on the light emitting side for improving a color saturation level of a LCD using the backlight module.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
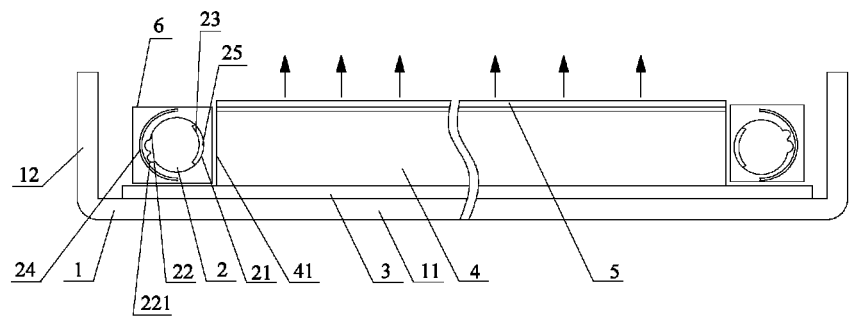
FIG. 1 is a schematic view of a backlight module according to a first embodiment of the present disclosure.
Figure 2:
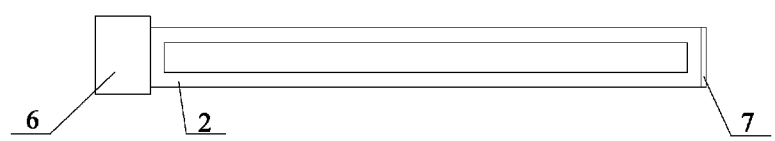
FIG. 2 is a schematic view showing a light source coupling devices and a reflecting plate of the backlight module of FIG. 1 are respectively coupled to two opposite ends of a light tube of the backlight module.

Referring to FIGS. 1 and 2, a backlight module according to a first embodiment of the present disclosure includes a back plate 1, two light tubes 2, a reflecting plate 3, a light guide plate 4, an optical film 5, and at least two light source coupling devices 6.

The back plate 1 includes a base portion 11 and two side portions 12 extending from two opposite ends of the base portion 11 respectively. The reflecting plate 3 is arranged on the base portion 11 and is located between the two side portions 12.

The light guide plate 4 is arranged on the reflecting plate 3. The light guide plate 4 includes a bottom surface corresponding to the reflecting plate 3, a light emitting surface opposite to the bottom surface, and two light incident surfaces 41 respectively corresponding to the side portions 12 and connecting the bottom surface with the light emitting surface. The bottom surface of the light guide plate 4 is fixed to the center of the reflecting plate 3. The optical film 5 is arranged on the light emitting surface of the light guide plate 4.

The two light tubes 2 are respectively disposed in two spaces defined between the light incident surfaces 41 and the side portions 12.

As shown in FIG. 2, in the embodiment, the backlight module includes two of the light source coupling devices 6 respectively connected to the light tubes 2. Each light source coupling device 6 is disposed on one end of the corresponding light tube 2 for supplying and emitting light to the corresponding light tube 2. The light source coupling device 6 can be LED lamps, hernia lamps, or any other high power light source. In this state, the backlight module may further include two reflecting panels 7 respectively disposed on two other ends of the light tubes 2.

Figure 3:
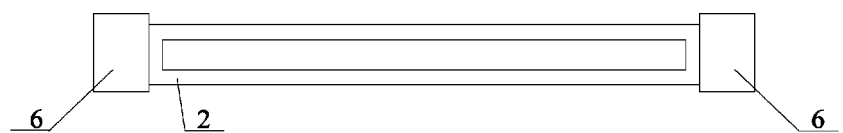
FIG. 3 is similar to the FIG. 2 but with the reflecting plate being replaced by another light source coupling devices.

It is noted that the numbers of the light tube 2 and the light source coupling device 6 are respectively not limited to this embodiment. In other embodiments, the backlight module may include only one light tube 2 and one light source coupling device 6 disposed on one end of the light tube 2. Also, to the backlight module with the two light tubes 2, the backlight module in some embodiments may include four of the light source coupling devices 6 for supplying much more light and used in backlight module of bigger size. As shown in FIG. 3, every two of the light source coupling devices 6 are respectively disposed on two opposite ends of the corresponding light tube 2 with the omission of the reflecting panel 7.

Figure 4:
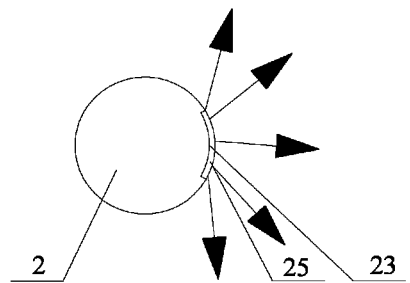
FIG. 4 is a cross section view of the light tube of the backlight module of FIG. 1 with a first micro-structure.
Figure 5:
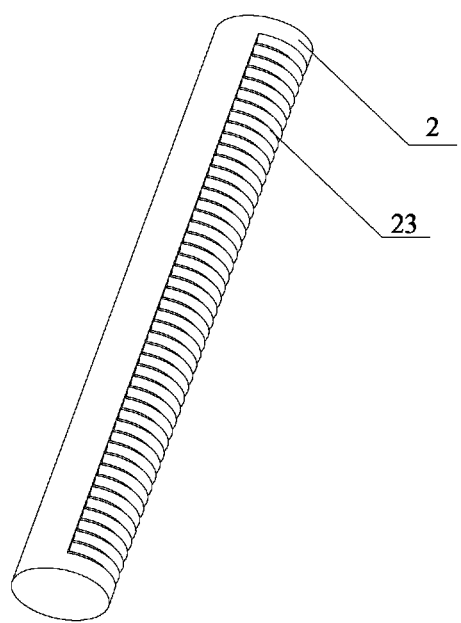
FIG. 5 is a schematic view of the light tube of FIG. 4.
Figure 6:
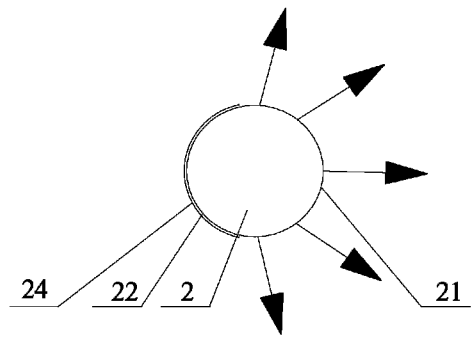
FIG. 6 is a cross section view of the light tube of the backlight module of FIG. 1 with a reflecting structure.

Each light tube 2 includes a light emitting side 21 facing the light incident surface 41, and a non-light emitting side 22 opposite to the light emitting side 21. Referring to FIGS. 4 to 6, the light tube 2 also includes a first micro-structure 23, a second micro-structure 221, a reflecting structure 24, and a fluorescent layer 25. The first micro-structure 23 is disposed on the light emitting side 21 for breaking total reflections of the light in the light tube 2 and further improving the using efficiency of the light tube 2. In the embodiment, the first micro-structure 23 includes a number of grooves defined on the light emitting side 21 and the cross section of each groove is hemisphere, rhombic, semi-oval, or the like, and the light guide tube 2 is made of high pure polymethyl methacrylate (PMMA) or silicon dioxide (SiO2) and the cross section thereof is circular or elliptical.

Figure 7:
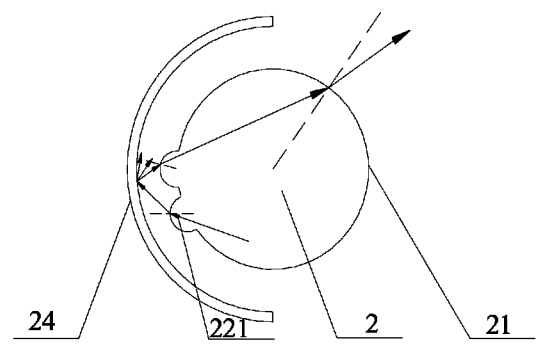
FIG. 7 is a cross section view of the light tube of the backlight module with a second micro-structure.

The second micro-structure 221 is disposed on the non-light emitting side 22 to allow the non-light emitting side 22 to be rough. In the embodiment, as shown in FIG. 7, the second micro-structure 221 includes a number of protrusions protruding from the non-light emitting side 22 and the cross section of each protrusion is hemisphere, rhombic, semi-oval, or other shape.

The reflecting structure 24 is disposed on the second micro-structure 221 to improve the reflection of the light. In some embodiments, the reflecting structure 24 can be a reflecting plate or a reflecting film.

With the second micro-structure 221, the light travels in the light tube 2 and goes to the second micro-structure 221 where the light is diffused and goes to the reflecting structure 24. Reflected by the reflecting structure 24, the light goes back to the second micro-structure 221 to be diffused again and goes to the light emitting side 21. Diffused again by the first micro-structure 23, the light eventually goes out from the light emitting side 21.

The fluorescent layer 25 is coated on an external surface of the first micro-structure 23 for improving a color saturation of a liquid crystal display (LCD) using the backlight module.

With the backlight module in the embodiment, the light can be emitted from the light tube 2 evenly to improve the light using efficiency and reduce the manufacturing cost of the light tube 2. Also, with the fluorescent layer 25, the color saturation level of the LCD using the backlight module can be improved.

Figure 8:
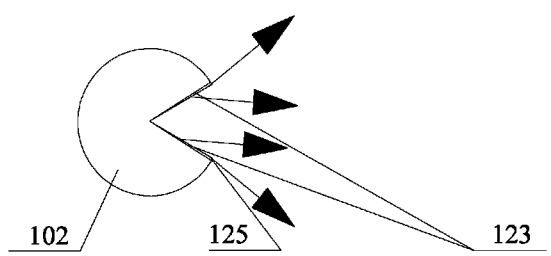
FIG. 8 is a cross section view of the light tube according to a second embodiment of the present disclosure.

Referring to FIG. 8, a backlight module according to a second embodiment of the present disclosure is shown. Compared with that of the first embodiment, the cross section of the light tube 102 in the second embodiment is fan shape, and the light tube 102 includes an arch surface corresponding to the non-light emitting side thereof and two flat surfaces corresponding to the light emitting side thereof. In this state, a first micro-structure 123 similar to that of the first embodiment is disposed on the two flat surfaces of the fan shaped light tube 2. The backlight module in the embodiment further includes a fluorescent layer 125 coated on the first micro-structure 123. With the fan shaped light tube 2, the emitting angle of the light emitted from the light tube 2 is easily to be controlled to allow the light to go into the light guide plate 4 as much as possible.

Figure 9:
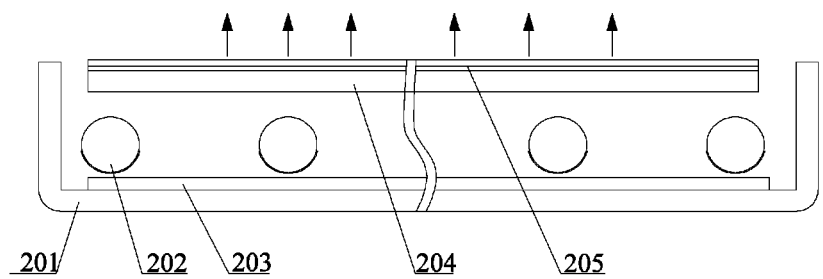
FIG. 9 is a schematic view of a backlight module according to a third embodiment of the present disclosure.

Referring to FIG. 9, a backlight module according to a third embodiment of the present disclosure is shown. Compared with the first embodiment, the backlight module in the third embodiment includes a diffusing plate 204 replacing the light guide plate 4. Specifically, the light tubes 202 are sandwiched between the reflecting plate 203 and the diffusing plate 204, the reflecting plate 203 is still arranged on the back plate 201, and the optical film 205 is arranged on one side the diffusing plate 204 away from the light tubes 202.

The present disclosure further provides a LCD with the above backlight module. Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A backlight module comprising a light tube, wherein the light tube comprises a light emitting side for emitting light and a first micro-structure disposed on the light emitting side for breaking total reflections of the light in the light tube; the backlight module further comprises a fluorescence layer coated on a surface of the first micro-structure; the light tube is made of polymethyl methacrylate or silicon dioxide, and the light tube further comprises a non-light emitting side opposite to the light emitting side and a reflecting structure disposed on the non-light emitting side; the light tube further comprises a second micro-structure disposed on the non-light emitting side, the reflecting structure is a reflecting plate or a reflecting film disposed on the second micro-structure; and the second micro-structure comprises a plurality of protrusions protruding from the non-light emitting side and a cross section of each protrusion is hemisphere, rhombic, or semi-oval; wherein the first micro-structure comprises a plurality of grooves defined on the light emitting side and the cross section of each groove is hemisphere, rhombic, or semi-oval;

a cross section of the light tube is circular or elliptical; or the cross section of the light tube is fan shaped, and the light tube comprises an arch surface corresponding to the non-light emitting side and two flat surfaces corresponding to the light emitting surface.

2. The backlight module of claim 1, wherein the light tube further comprises at least a light source coupling device for supplying and emitting the light to the light tube, the at least one light source coupling device is disposed on at least one end of the light tube.

3. The backlight module of claim 2, wherein the backlight module further comprises a back plate, a reflecting plate, a diffusing plate and an optical film, the back plate comprises an base portion and two side portions extending from two opposite ends of the base portion, the reflecting plate is arranged on the base portion; the light tube is sandwiched between the reflecting plate and the diffusing plate, and the optical film is arranged on one side of the diffusing plate away from the light tube.

4. The backlight module of claim 2, wherein the backlight module further comprises a back plate, a reflecting plate, a light guide plate, and an optical film, the back plate comprises a base portion and two side portions extending from two opposite ends of the base portion, the reflecting plate is arranged on the base portion, the light guide plate is sandwiched between the reflecting plate and the optical film, the light tube is arranged between the side portion and the light guide plate with a light emitting side thereof facing a light incident surface of the light guide plate.

5. A liquid crystal display, comprising a backlight module that comprises a light tube, wherein the light tube comprises a light emitting side for emitting light and a first micro-structure disposed on the light emitting side for breaking total reflections of the light in the light tube; a fluorescence layer is coated on a surface of the first micro-structure; the light tube is made of polymethyl methacrylate or silicon dioxide, and the light tube further comprises a non-light emitting side opposite to the light emitting side and a reflecting structure disposed on the non-light emitting side; the light tube comprises a second micro-structure disposed on the non-light emitting side, the reflecting structure is a reflecting plate or a reflecting film disposed on the second micro-structure, the second micro-structure comprises a plurality of protrusions protruding from the non-light emitting side and the cross section of each protrusion is hemisphere, rhombic, or semi-oval; the first micro-structure comprises a plurality of grooves defined on the light emitting side and the cross section of each groove is hemisphere, rhombic, or semi-oval;

a cross section of the light tube is circular or elliptical; or the cross section of the light tube is fan shaped, and the light tube comprises an arch surface corresponding to the non-light emitting side and two flat surfaces corresponding to the light emitting side.

6. The liquid crystal display of claim 5, wherein the light tube further comprises at least a light source coupling device for supplying and emitting light to the light tube, and the at least at one light source coupling device is disposed on at least one end of the light tube.

7. The liquid crystal display of claim 6, wherein the backlight module further comprises a back plate, a reflecting plate, a diffusing plate and an optical film, the back plate comprises an base portion and two side portions extending from two opposite ends of the base portion, the reflecting plate is arranged on the base portion; the light tube is sandwiched between the reflecting plate and the diffusing plate, and the optical film is arranged on one side of the diffusing plate away from the light tube.

8. The liquid crystal display of claim 6, wherein the backlight module further comprises a back plate, a reflecting plate, a light guide plate, and an optical film, the back plate comprises a base portion and two side portions extending from two opposite ends of the base portion, the reflecting plate is arranged on the base portion, the light guide plate is sandwiched between the reflecting plate and the optical film, and the light tube is arranged between the side portion and the light guide plate with a light emitting side thereof facing a light incident surface of the light guide plate.

\* \* \* \* \*